United States Patent
Hamilton et al.

(10) Patent No.: US 9,724,792 B2
(45) Date of Patent: Aug. 8, 2017

(54) METHOD OF RECOVERING STEEL REINFORCEMENT FROM CONVEYOR BELTS

(71) Applicants: John S. Hamilton, Hinsdale, IL (US); David J. Maguire, Hudson, OH (US)

(72) Inventors: John S. Hamilton, Hinsdale, IL (US); David J. Maguire, Hudson, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 169 days.

(21) Appl. No.: 14/614,725

(22) Filed: Feb. 5, 2015

(65) Prior Publication Data
US 2015/0231747 A1   Aug. 20, 2015

Related U.S. Application Data

(60) Provisional application No. 61/940,099, filed on Feb. 14, 2014.

(51) Int. Cl.
*B23P 19/04*    (2006.01)

(52) U.S. Cl.
CPC ......... *B23P 19/04* (2013.01); *Y10T 29/49815* (2015.01)

(58) Field of Classification Search
CPC ............... B23P 19/04; Y10T 29/49815; Y10T 156/1158; Y10T 156/1168; Y10T 156/919;
(Continued)

(56) References Cited

U.S. PATENT DOCUMENTS 2,291,862 A * 8/1942 Bailey ................... B29B 17/021
    134/1
3,429,761 A * 2/1969 Bleher .................... B29B 17/00
    156/247
(Continued)

FOREIGN PATENT DOCUMENTS

| DE | 10 2006 005407 A1 | 8/2006 |
|---|---|---|
| EP | 2698238 A1 | 10/2012 |
| JP | 2003 260437 | 9/2003 |

OTHER PUBLICATIONS

Korzen Z. "Recovery of Rubber and Steel Cords From Conveyor Belts", International Polymer Science and Technology, Rapra Technology, Shrewbury, GB, vol. 19, No. 12, pp. T51-T57.
(Continued)

*Primary Examiner* — Larry E Waggle, Jr.
*Assistant Examiner* — Henry Hong
(74) *Attorney, Agent, or Firm* — Alvin T. Rockhill

(57) ABSTRACT

The present invention is based upon the discovery that the level of adhesion between steel reinforcing elements and rubber products, such as conveyor belts, in which they are embedded can be significantly reduced by heating the steel reinforcing elements by induction heating to break down the level of bonding between the steel reinforcing elements and the rubber in the article. The present invention more specifically discloses a method for recovering steel reinforcements from a conveyor belt carcass having steel reinforcements which are bonded to the carcass of the conveyor belt, said method comprising (1) heating the steel reinforcements in the conveyor belt by induction heating to a temperature which is sufficient to substantially breakdown bonding between the steel reinforcements and the carcass of the conveyor belt and (2) applying a mechanical force to the
(Continued)

steel reinforcements which is sufficient to separate the steel reinforcements from the conveyor belt carcass.

10 Claims, 4 Drawing Sheets

(58) Field of Classification Search
CPC ......... Y10T 156/1917; Y10T 156/1978; Y10T 156/928; B32B 43/006; B32B 38/10
USPC ......... 264/319, 322, 913, 915, 37.1; 241/23, 241/24.1; 29/426.1
IPC ....................................................... B23P 19/04
See application file for complete search history.

(56) References Cited

U.S. PATENT DOCUMENTS

| | | | | |
|---|---|---|---|---|
| 5,250,131 A | * | 10/1993 | Gitelman | ................ B29B 17/02 156/272.2 |
| 5,316,224 A | | 5/1994 | Dobozy | .......................... 241/30 |
| 5,362,759 A | * | 11/1994 | Hunt | ........................ C08J 11/20 521/148 |
| 5,492,657 A | | 2/1996 | Danschikov et al. | .......... 264/37 |
| 5,500,072 A | * | 3/1996 | Fujimura | ................ B29B 17/02 156/701 |
| 5,611,492 A | * | 3/1997 | Hunt | ....................... B02C 19/22 241/23 |

OTHER PUBLICATIONS

European Search Report, EP 15 154 209.9-1706.

* cited by examiner

METHOD OF RECOVERING STEEL REINFORCEMENT FROM CONVEYOR BELTS

This application claims the benefit of U.S. Provisional Patent Application Ser. No. 61/940,099, filed on Feb. 14, 2014. The teachings of U.S. Provisional Patent Application Ser. No. 61/940,099 are incorporated herein by reference in their entirety.

FIELD OF THE INVENTION

The invention relates to a method for recovering steel reinforcing elements from rubber articles, such as conveyor belts, which are reinforced therewith. This makes recycling the rubber and steel components of the rubber article energy efficient and cost effective.

BACKGROUND OF THE INVENTION

In a multitude of commercial applications, it is common to employ heavy-duty conveyor belts for the purpose of transporting products and materials. Such conveyor belts can be very wide, for instance ten feet wide, and very long, for example, on the order of many miles. They can also be up to about three inches thick or even thicker. In any case, heavy-duty conveyor belts are widely used for moving minerals, coal, and a wide variety of manufactured products from one point to another. For instance, heavy-duty conveyor belts are often used in typical mining applications to transport minerals below the ground, to above the surface, and ultimately above ground to a desired location for processing and/or ultimately for transportation on rail road cars, trucks, barges, or ships.

Conventional conveyor belts which are used in heavy duty applications are typically comprised of a cured rubber as a top layer (the carry cover layer), a cured rubber as a bottom layer (the pulley cover layer), and a steel reinforcement layer which is situated between the top layer and the bottom layer. The predominant material used in such conveyor belts generally is a moderately flexible elastomeric or rubber-like material, and the belt is typically reinforced by a plurality of longitudinally extending steel cables or cords which are positioned within the belt and extend along the length thereof.

All conveyor belts are, of course, susceptible to normal wear and tear as well as damage from the material being transported and/or harsh environmental conditions. Over the years, substantial improvements have been made in the wear resistance of the rubber used as the cover carry layer of the conveyor belts and the useful service life of conveyor belts has been extended. However, transporting highly abrasive materials can quickly wear away the carry cover layer of conveyor belts. In any case, conveyor belts which are used in mining operations are particularly susceptible to damage from the material transported thereon and a rip, slit, cut or tear may develop on the surface of the belt which comes in contact with the material being transported (the carry cover surface of the belt). For instance, sharp edges of the material being transported, such as iron ore and copper ore which are particularly abrasive, can gouge the surface of the belt and that can result in a rip developing and propagating deeper into the body of the belt. Such damage can ultimately result in belt failure. In any case, all conveyor belts including those that are utilized in application which have light demands have a finite long service and ultimately must be replaced.

In the world today, there is a demand for end-of-life recyclability of many consumer and industrial products including both large and small conveyor belts. However, recycling rubber products which are reinforced with steel reinforcing elements presents a particular challenge since it is generally necessary to separate the steel reinforcing elements in such rubber products from rubber components thereof. After such a separation has been completed it is then, of course, possible to recycle the rubber in one recycle stream with the steel being recycled in a separate recycle stream. However, such a separation is not an easy task since measures are taken for the steel reinforcing elements to be bonded securely to the carcass of the rubber product so that separation does not occur during its service life. In any case, it is not energy efficient or cost effective to remove steel reinforcing elements from conveyor belts by applying high levels of mechanical force to separate the steel reinforcements from the belt using conventional technology. Nevertheless, there has been a long felt need for an energy efficient and cost effective means for separating steel reinforcing elements from conveyor belts.

SUMMARY OF THE INVENTION

The present invention is based upon the discovery that the level of adhesion between steel reinforcing elements and rubber products, such as conveyor belts, in which they are embedded can be significantly reduced by heating the steel reinforcing elements by induction heating to breakdown the level of bonding between the steel reinforcing elements and the rubber in the belt. This makes it energy efficient to remove the steel reinforcing element from the rubber carcass of the article because the mechanical force required to pull the steel from the rubber product in greatly reduced. In fact, the pullout force required to remove steel reinforcements from a rubber article after induction heating can be reduced by 80%, 90%, 95%, 98% and in some cases virtually 100%. Also, the rubber coverage of the steel reinforcements after being removed from the rubber article can be reduced to less than 5%, preferable less than 2%, and most preferably less than 1%. In fact, in some case the rubber coverage can be reduced to essentially 0%.

The present invention more specifically discloses a method for recovering steel reinforcements from a conveyor belt carcass having steel reinforcements which are bonded to the carcass of the conveyor belt, said method comprising (1) heating the steel reinforcements in the conveyor belt by induction heating to a temperature which is sufficient to substantially breakdown bonding between the steel reinforcements and the carcass of the conveyor belt and (2) applying a mechanical force to the steel reinforcements which is sufficient to separate the steel reinforcements from the conveyor belt carcass.

In one embodiment of this invention the steel reinforcements are separated from the conveyor belt after the adhesion between the steel reinforcement and the rubber in the belt has be substantially destroyed by induction heating via a method which involves (1) pulling every other steel reinforcement in the conveyor belt in a first direction with the remaining steel reinforcements being pulled in another direction to split the conveyor belt into a first split component and a second split component, and (2) reeling the steel reinforcing elements from the first split component onto a first steel cord take-up spool and the rubber component from the first split component onto a first rubber take-up spool, and simultaneously reeling the steel reinforcing elements from the second split component onto a second steel cord take-up spool and the rubber component from the second split component onto a second rubber take-up spool. This method of removing the steel reinforcements from the used (worn-out) conveyor belt is typically conduction on a continuous basis in commercial applications.

DETAILED DESCRIPTION OF THE INVENTION

Figure 1:
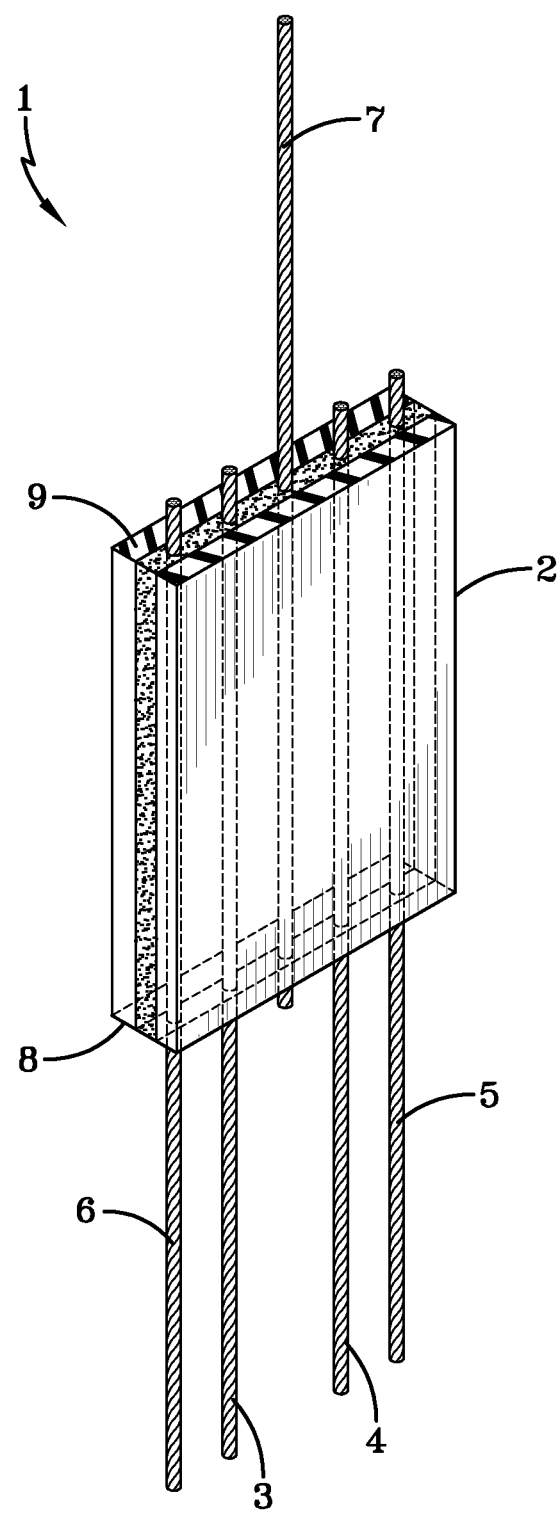
FIG. 1 is an illustration of the test specimens made for evaluation in Examples 1-7. These test specimens were made to mimic a conventional conveyor belts having a 6 mm thick carry cover layer which was comprised of a natural rubber blend, a 5.2 mm thick reinforcement layer which included 2.5 mm gauge 7×7 steel cables which were embedded in an adhesive rubber tie gum, and a 5 mm thick pulley cover layer which was comprised of a second natural rubber blend.

In practicing this invention electrical induction heating is applied to the metal reinforcements of a rubber article, such as a conveyor belt, which has reached the end of its useful service life. This is done by passing the rubber article containing the steel reinforcements through an electromagnetic field which is sufficient to create eddy currents (Foucault currents) within the steel elements which leads to Joule heating. In any case, the electromagnetic induction heater consists of an electromagnet through which a high-frequency alternating current is passed. The rubber article is typically passed in close proximity to one or more of such electromagnetic induction heaters.

The induction heating is typically applied utilizing high-frequency alternating current at a frequency which is within the range of 100 KHz to 600 KHz. The induction heating is more typically applied utilizing high-frequency alternating current at a frequency which is within the range of 150 KHz to 500 KHz. For instance, the induction heating can be applied utilizing high-frequency alternating current at a frequency which is within the range of 200 KHz to 300 KHz or which is within the range of 250 KHz to 350 KHz. The induction heating is typically applied utilizing an applied power which is within the range of 30 kw-sec. to 1000 kw-sec. The induction heating is more typically applied utilizing an applied power which is within the range of 40 kw-sec. to 600 kw-sec. For instance, the induction heating can be applied utilizing an applied power which is within the range of 50 kw-sec. to 400 kw-sec, which is within the range of 70 kw-sec. to 200 kw-sec, or which is within the range of 70 kw-sec. to 150 kw-sec.

The rubber article can be passed through the electromagnetic field in a continuous manner. This is particularly advantageous in the case of conveyor belts by virtue of their long length. In any case, the eddy currents generated within the steel reinforcing elements will be sufficient to cause Joule heating which is sufficient to heat the steel to a temperature which causes the bonding between the steel and the rubber carcass in which it is embedded to break. This allows for easy removal of the steel reinforcements from the rubber article.

The removal of the steel reinforcing elements from conveyor belts is optimally carried out on a continuous basis after the adhesion between the rubber and the steel reinforcing elements has been broken by the induction heating. This can be done by reeling the steel reinforcing elements (steel cords) in one direction onto a take-up spool while the rubber components of the conveyor belt are reeled in other directions onto one or more separate take-up spools. Since the adhesion between the steel cords and the rubber components of the conveyor belt has been greatly reduced this can be accomplished without requiring excessively high levels of force. However, in some embodiments of this invention the separation apparatus can include cutting blades which are oriented to facilitate the separation of the steel cords from the rubber layers of the conveyor belt. In other words, in one embodiment of this invention a cutting blade can be used to assist in the removal of the steel cords by cutting the carry cover layer and the pulley cover layers of the conveyor belt from the steel cords. In one scenario multiple take-up spools can be utilized to collect the rubber from the carry cover layer, the steel cords, and the rubber from the pulley cover layer. In other words, the rubber from above the steel reinforcement layer can be collected on one spool and the rubber from below the steel reinforcement layer can be collected on a second spool with the steel cords being collected on a third spool.

Figure 2:
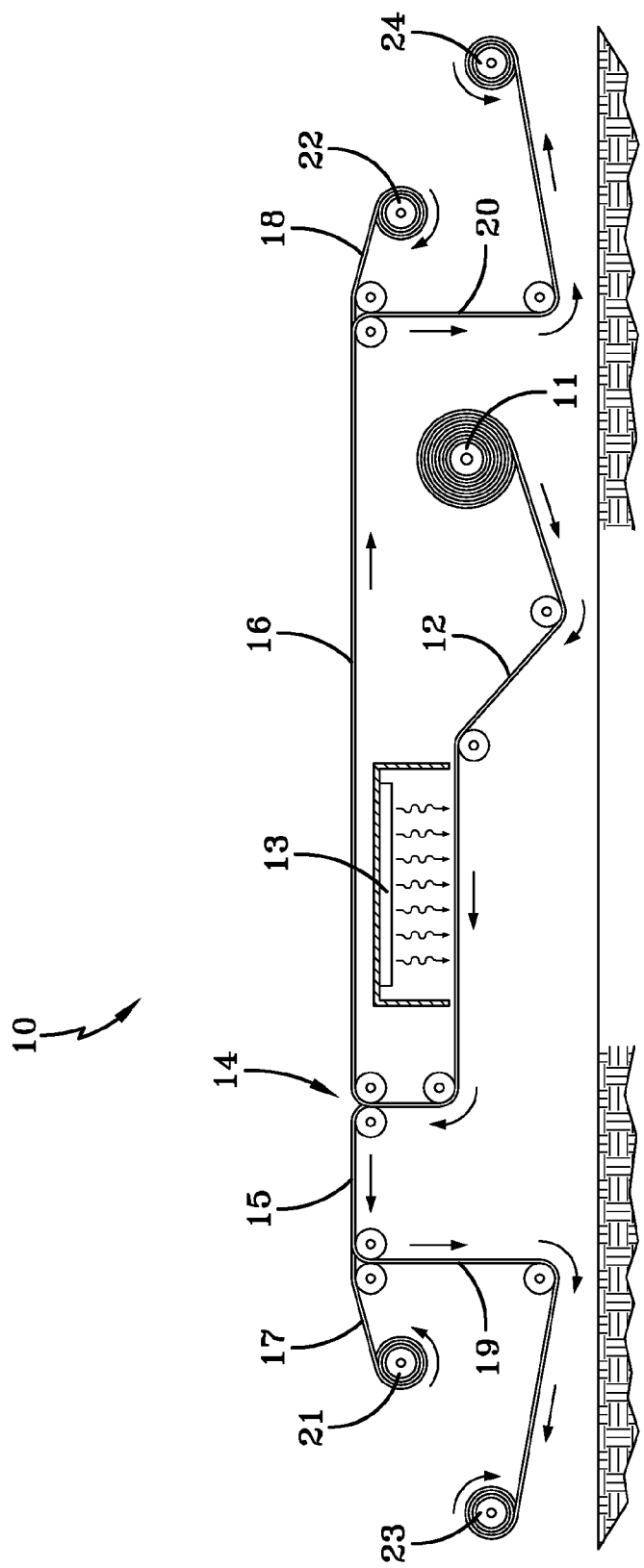
FIG. 2 is a schematic drawing of an apparatus that can be used for continuously removing the steel cords from a used (worn-out) conveyor belt in a preferred embodiment of this invention.
Figure 3:
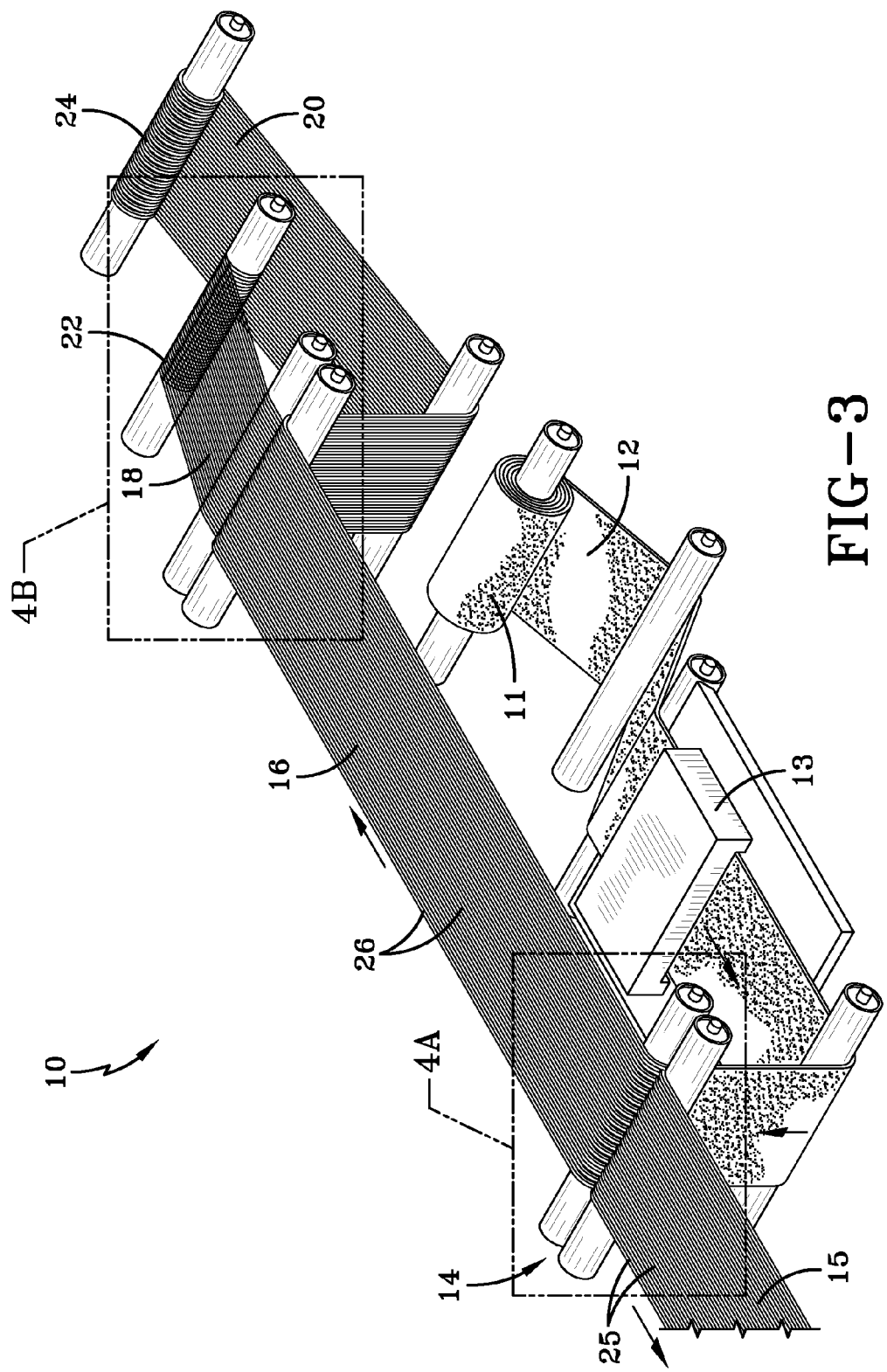
FIG. 3 illustrates a portion of the apparatus depicted in FIG. 2 which more clearly shows the manner in which the conveyor belt is split into two approximately equal halves.
Figure 4A:
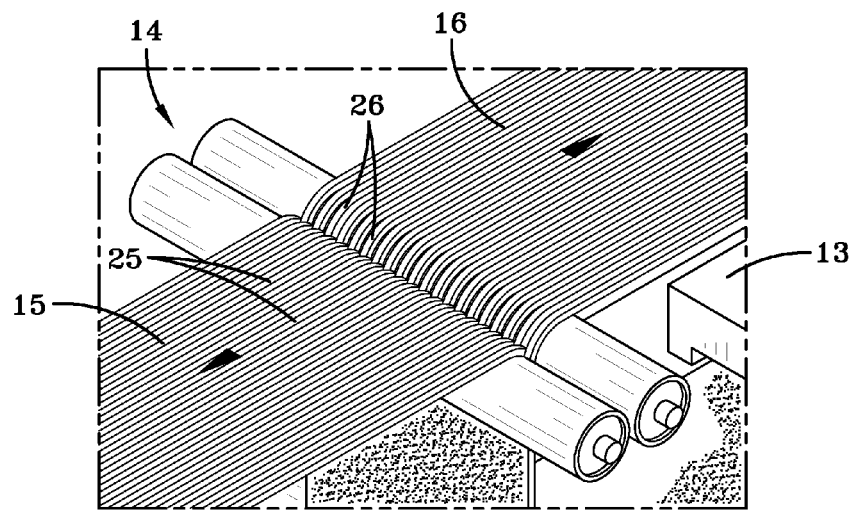
FIG. 4A illustrates the manner in which every other cord is pulled in a first direction with the remaining cords being pulled in the opposition direction at the point where the conveyor belt is split in the preferred embodiment of the invention illustrated in FIG. 2.
Figure 4B:
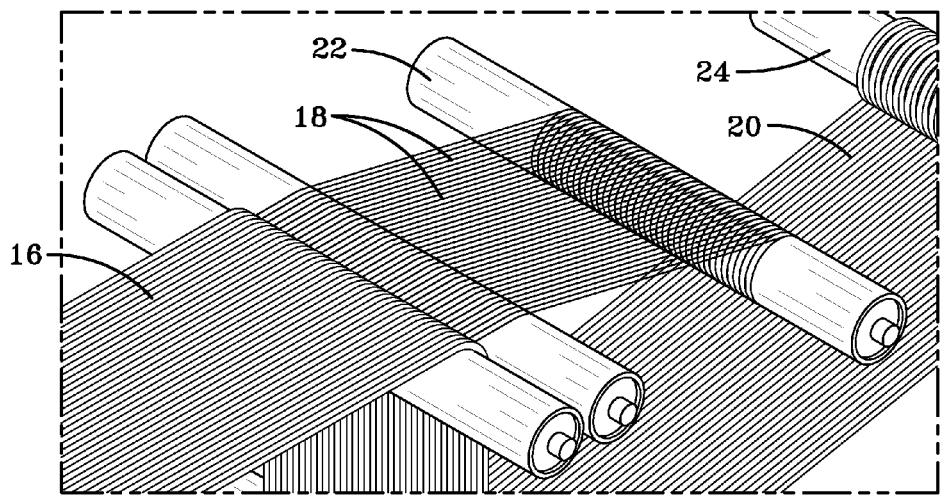
FIG. 4B illustrates the manner in which the steel cords are removed from the rubber components of the conveyor belt in the preferred embodiment of the invention illustrated in FIG. 2.

In a preferred embodiment of this invention the steel reinforcing elements are continuously removed from the carcass of the used conveyor belt via the method and equipment depicted in FIG. 2. In this technique the used (worn-out) conveyor belt 12 is continuously pulled from a feed roll 11 and is passed through an induction heating unit 13. The conveyor belt 12 has a sufficient residence time in the induction heating unit 13 for the steel of which the reinforcing elements are comprised to reach a temperature which is sufficient to substantially destroy the adhesion between the reinforcing elements and the rubber in the conveyor belt. The heat treated conveyor belt is then passed through a splitter 14 which at which point every other steel core 25 is pulled in a first direction (to the right) with the remaining steel cords 26 being pulled in the opposite direction (to the left) as illustrated in FIG. 3. This essentially splits the conveyor belt 12 into two halves from which the steel cords can be easily removed from the rubber components of the belt. The first half of the belt 15 is pulled in a first direction (to the right) with the second half of the belt 16 being pulled in the opposite direction (to the left). As can be seen in FIG. 4A and FIG. 4B, the first half of the best 15 is pulled in the first directed (to the right) with every other steel cord 25. The other half of the conveyor belt 16 is pulled in the opposite direction (to the left) with the remaining steel cords 26. The steel cords 25 and 26 can then easily be separated from the rubber components remaining on the two halves the split conveyor belt. As depicted in FIG. 2, the steel cords 17 and 18 can then be collected on take-up rolls 21 and 22, respectively, with the rubber components of the belts 19 and 20 being collected on take-up rolls 23 and 24, respectively.

In another embodiment of this invention the steel reinforcing elements are continuously removed from the carcass of conveyor belts utilizing a grinding process. In such a process induction heating is utilized in accordance with this invention to heat the steel cords of the conveyor belt to destroy the adhesion between the steel cords and the rubber in the belt. This is typically accomplished by continuously passing the conveyor belt through an induction heating zone. Then, after the adhesion between the steel cords and the rubber components of the belt has been substantially reduced the belt is continuously feed into a grinder or a series of grinders to make a ground composition which is comprised of ground rubber and ground steel cords. The ground steel cords are then separated from this ground composition by application of magnetic forces, such as by applying an electromagnet to attract the ground steel cords. The ground steel cord fragments can then be collected separately from the ground rubber fragments. The ground steel and the ground rubber are then both available for recycling into a wide variety of useful products.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1-7

In this series of experiments the steel cords of a conveyor belt test specimens were heated by induction heating with the adhesion between the steel cords and the carcass of the simulated conveyor belt being assessed after applying various treatment conditions. In the procedure used, test specimens were molded to mimic a conventional conveyor belt having a 6 mm thick carry cover layer which was comprised of a natural rubber blend, a 5.2 mm thick reinforcement layer which included 2.5 mm gauge 7×7 steel cables which were embedded in an adhesive rubber tie gum, and a 5 mm thick pulley cover layer which was comprised of a second natural rubber blend. The test specimens are illustrated in FIG. 1. As can be seen, the samples 1 contained 5 steel cords 3, 4, 5, 6, and 7 which protruded from the body 2 of the test samples 1. The samples were removed from the conveyor belt in a whereby 4 steel cords 3, 4, 5, and 6 protruded out of a first end 8 of the test samples with the fifth steel cord 7 protruding out the opposite end 9 of the test samples. The bodies of the test samples were approximately 70 mm wide and approximately 102 mm long. The steel cables protruded for the bodies of the test samples about 102 mm.

The test samples were then heated along their entire length by a single induction heater which was situated above the top surface of the test samples or by two inductions heaters with one being situated above the top surface of the test samples and the other being situated beneath the test specimens. The nature of the induction heating applied and pull out force required to pull the steel cords from the test specimens is reported in Table 1. Example 1 was conducted as a control with no induction heating being applied.

| Example | Exposure | Power | Time | Applied Power | Pull Out Force |
|---|---|---|---|---|---|
| 1 (Control) | none | — | — | — | 2,933 lbs. |
| 2 | top | 3.6 kw | 15 sec. | 54 kw-sec. | 165 lbs. |
| 3 | top | 6.0 kw | 15 sec. | 90 kw-sec. | 60 lbs. |
| 4 | top & bottom | 3.6 kw | 15 sec. | 108 kw-sec. | 57 lbs. |
| 5 | top & bottom | 6.0 kw | 15 sec. | 180 kw-sec. | 43 lbs. |
| 6 | top | 6.0 kw | 30 sec. | 180 kw-sec. | 27 lbs. |
| 7 | top & bottom | 6.0 kw | 30 sec. | 360 kw-sec. | 8 lbs. |

As can be seen from Table 1, the pull out force required to pull the steel cables out of the test specimens decreased dramatically after being heated by induction heating. In fact, the pull out force required at even the lowest applied power setting (Example 2) reduced the pull out force required to less than 6 percent of the force required in the case of the control samples (Example 1). At the highest applied power setting the pull out force required to remove the steel cables from the test specimens was less than 0.3 percent of the force required in the case of the control. Accordingly, this series of experiments shows that induction heating can be employed to destroy virtually all of the adhesive bonding between the steel cables and the carcass of the conveyor belt.

The experiment also shows that the induction heating can be applied from the top of the conveyor belt or both the top and the bottom of the belt. However, this experiment further shows that it is more efficient to apply the heating from only one side of the conveyor belt. This can clearly be seen by comparing Examples 5 and 6 where 180 kw-sec. of applied power was employed in both cases. However, a significantly greater reduction in poll out force was realized in Example 6 where the induction heating was only applied from the top of the belt.

This series of experiments also shows that the adhesion retention decreases with increasing levels of applied power up to about 360 kw-sec. where virtually all of the adhesive bonding between the steel cable and the carcass of the conveyor belt is destroyed. However, at applied power setting above about 100 kw-sec. the benefit of utilizing higher power settings diminishes rapidly. Accordingly, from the standpoint of efficient energy utilization it will typically not be beneficial to employ an applied power of over about 100 kw-sec.

It was also determined through this series of experiments that the rubber coverage on the steel cords which were removed from the test samples could be reduced to less than 5%. In fact, the rubber coverage on the steel cables could be reduced to less than 2% and even less than 1% in some cases. At higher applied power settings the rubber coverage on the steel cords which were removed from the conveyor belt was reduced to essentially 0%.

While certain representative embodiments and details have been shown for the purpose of illustrating the subject invention, it will be apparent to those skilled in this art that various changes and modifications can be made therein without departing from the scope of the subject invention.

What is claimed is:

1. A method for recovering steel reinforcements from a conveyor belt carcass having steel reinforcements which are bonded to the carcass of the conveyor belt, said method comprising (1) heating the steel reinforcements in the conveyor belt by induction heating to a temperature which is sufficient to substantially breakdown bonding between the steel reinforcements and the carcass of the conveyor belt and (2) separating the steel reinforcements from the conveyor belt carcass, wherein the steel reinforcements are separated from the conveyor belt by (a) pulling every other steel reinforcement in the conveyor belt in a first direction with remaining steel reinforcements being pulled in another direction to split the conveyor belt into a first split component and a second split component, and (b) reeling the steel reinforcing elements from the first split component onto a first steel cord take-up spool and a rubber component from the first split component onto a first rubber take-up spool, and simultaneously reeling the steel reinforcing elements from the second split component onto a second steel cord take-up spool and a rubber component from the second split component onto a second rubber take-up spool.

2. The method as specified in claim 1 wherein the induction heating is applied utilizing high-frequency alternating current at a frequency which is within a range of 100 KHz to 600 KHz.

3. The method as specified in claim 1 wherein the induction heating is applied utilizing high-frequency alternating current at a frequency which is within a range of 150 KHz to 500 KHz.

4. The method as specified in claim 1 wherein the induction heating is applied utilizing high-frequency alternating current at a frequency which is within a range of 200 KHz to 300 KHz.

5. The method as specified in claim 1 wherein the induction heating is applied utilizing high-frequency alternating current at a frequency which is within a range of 250 KHz to 350 KHz.

6. The method as specified in claim 1 wherein the induction heating is applied utilizing an applied power which is within a range of 30 kw-sec. to 1000 kw-sec.

7. The method as specified in claim 1 wherein the induction heating is applied utilizing an applied power which is within a range of 40 kw-sec. to 600 kw-sec.

8. The method as specified in claim 1 wherein the induction heating is applied utilizing an applied power which is within a range of 50 kw-sec. to 400 kw-sec.

9. The method as specified in claim 1 wherein the induction heating is applied utilizing an applied power which is within a range of 70 kw-sec. to 200 kw-sec.

10. The method as specified in claim 1 wherein the induction heating is applied utilizing an applied power which is within a range of 70 kw-sec. to 150 kw-sec.

* * * * *